United States Patent [19]

Tolson

[11] Patent Number: 5,568,590
[45] Date of Patent: Oct. 22, 1996

[54] IMAGE PROCESSING USING GENETIC MUTATION OF NEURAL NETWORK PARAMETERS

[75] Inventor: Michael Tolson, Mill Valley, Calif.

[73] Assignee: Xaos Tools, San Francisco, Calif.

[21] Appl. No.: 168,948

[22] Filed: Dec. 17, 1993

[51] Int. Cl.$^6$ .............................. G06T 5/00; G06F 15/18
[52] U.S. Cl. ................................................. 395/13; 395/22
[58] Field of Search ........................................ 395/13, 22

[56] References Cited

PUBLICATIONS

David Salesin et al., "Adjustable Tools: An Object–Oriented Interaction Metaphor", ACM Transactions on Graphics, vol. 12, No. 1, Jan., 1993, pp. 103–107.
IBM Technical Disclosure Bulletin, vol. 33, No. 6B, Nov. 1990. US; pp. 61–62.
PCT International Application WO,A,90 11568 (Honeywell Inc.) 4 Oct. 1990; pp. 1–3.
Computer Graphics, vol. 25, No. 4, Jul. 1991, USA; Sims, K. "Artificial Evolution for Computer Graphics".
D. Montana and L. Davis, "Training Feedforward Neural Networks Using Genetic Algorithms," Proc. Int'l. Joint Conf. on Artificial Intelligence.
S. Baluja, et al., "Simulating a User's Preferences: Towards Automated Artificial Evolution for Computer Generated Images," Carnegie Mellon University, CMU–CS–93–198.

M. Schwartz et al., "A CMOS–Array–Computer with On–Chip Communication Hardware Developed for Massively Parallel Applications," *1991 IEEE Int'l. Joint Conf. on Neural Networks* (Nov. 1991), pp. 89–94.

T. Masui, "Graphic Layout with Interactive Genetic Algorithms," *Proc. 1992 IEEE Workshop on Visual Languages* (Sep. 1992), pp. 74–80.

*Primary Examiner*—Robert W. Downs
*Attorney, Agent, or Firm*—Judson D. Cary; Charles E. Gotlieb

[57] ABSTRACT

A system and method of image processing using neural networks to control image processing elements. Neural network parameters are defined by genotypes consisting of network vectors. Genotypes may be selectively mutated and cross-bred to provide a mechanism for modifying the behavior of the neural networks, or phenotypes. Genetic modeling processes are used to perform such mutation and cross-over. User feedback concerning output images, is used to select particular genotypes for further mutation and exploration. Preconditioning is employed to extract structural information from source images prior to network processing. Genetic morphing and subnet fusion are also available, to provide additional variations on image processing operations.

32 Claims, 6 Drawing Sheets

IMAGE PROCESSING USING GENETIC MUTATION OF NEURAL NETWORK PARAMETERS

CROSS REFERENCES TO RELATED APPLICATIONS

This application is related to the subject matter of U.S. patent application Ser. No. 07/983,894, filed Dec. 1, 1992, for "Dynamic Image Processing Using Particle Systems", the disclosure of which is incorporated herein by reference.

BACKGROUND OF THE INVENTION

1. Field of the Invention

This invention relates to image processing technologies and, more particularly, to a system and method of processing or synthesizing images using neural networks that may be generated and selectively mutated under user control.

2. Description of the Related Art

Image processing systems using computers are known in the art. Many sophisticated techniques may be employed to create image processing elements, or "brushes", that transform a source image according to specified parameters. In addition, image synthesis elements, also known as "brushes", may be employed to create interesting images without the need for a source image. In general, "brushes" may be defined as global or localized image processing or image synthesis elements.

Existing image processing systems may present a large variety of options to the user for generating and processing images. These options typically involve selection of a large number of brush parameters and algorithms for controlling the effect, behavior, creation, and destruction of brushes. The interaction among these various parameters and algorithms yields an astronomical number of combinations. It is often difficult for the user to explore the possibilities and generate the desired end product without a deep understanding of the brushes' operation and interaction. Thus, the very flexibility which makes such systems powerful can prevent effective use by ordinary users. What is needed is a system that allows a user to browse through the various possibilities, getting incrementally closer and closer to the desired effect or image, until the user is satisfied with the result.

Furthermore, existing systems generally do not retain or employ any knowledge of the underlying structure of the source image. If the source image depicts a tree in front of a house, an existing system does not employ any information regarding the identities of or the relationship between the tree and the house (e.g., that the tree is a certain distance in front of the house, that the tree is figure and the house is ground, or that the two objects are at different "depths" in the image).

SUMMARY OF THE INVENTION

The present invention uses structural information extracted from a source image to create more intelligent image processing and synthesis, and to provide more options for input to image processing elements. A preconditioning step is provided wherein structural information, such as edge detail description or gradients, is extracted from the image. This information may then be provided to brushes or other operators to facilitate image processing responsive to such information.

The present invention also provides an easy-to-use mechanism by which the user can explore various image-processing options without having a deep understanding of the operation of the individual image processing elements. Neural networks, or "phenotypes," are generated to control the behavior and characteristics of brushes. Network parameters are defined by network vectors, or "genotypes." Processed target images are created by application of each genotype, and presented to the user. The user provides feedback as to which phenotypes are more suitable than others, and genetic modeling processes are employed to modify the networks by mutating genotypes in response to user feedback regarding relative aesthetic suitability of the resulting target images. This feedback and mutation cycle is performed iteratively until the user is satisfied with the sample image. If desired, "cross-breeding" of two (or more) selected genotypes may be performed to generate new genetic varieties. Thus, the user is able to explore the universe of possible image-processing options in an intuitive manner, without necessarily having an analytical or functional understanding of how the brushes operate or are controlled.

If desired, certain characteristics of the selected genotype may be held constant, so that the direction of mutation can be controlled. Thus, as the user becomes more familiar with the underlying structure of the genotypes, the user can influence the mutation process to arrive at the desired result more quickly and efficiently. In addition, if desired, techniques of subnet fusion may be employed, wherein two or more neural networks are combined to operate on the image, each controlling a specified subset of brush parameters.

In addition, the present invention provides a mechanism of genetic morphing. The user selects two phenotypes, and the system defines a continuum of genotypes by interpolation between the genotypes corresponding to the two selections. Phenotypes are generated for genotypes at various points along the continuum. The user can then explore the continuum to select the most desirable of the interpolated phenotypes. Also, the system can generate an animated effect whereby a genotype is generated at each point in this continuum. For each genotype, a phenotype is instantiated and used to control the processing of a static image or frame in a sequence of images, resulting in an animation. In addition, one phenotype network may be bred to have as its output a control parameter to combine the application of two selected phenotypes, providing for a higher order localized control. In effect, one phenotype network, using the set of input data, outputs a parameter which determines how two other genotypes are to be combined and applied to the image.

If desired, more than two genotypes may be selected for genetic morphing. Known higher order interpolation techniques, such as bicubic interpolation, may be employed to fit a curve in genotype space to the selected genotypes.

DESCRIPTION OF THE PREFERRED EMBODIMENT

The Figures depict preferred embodiments of the present invention for purposes of illustration only.

Figure 1:
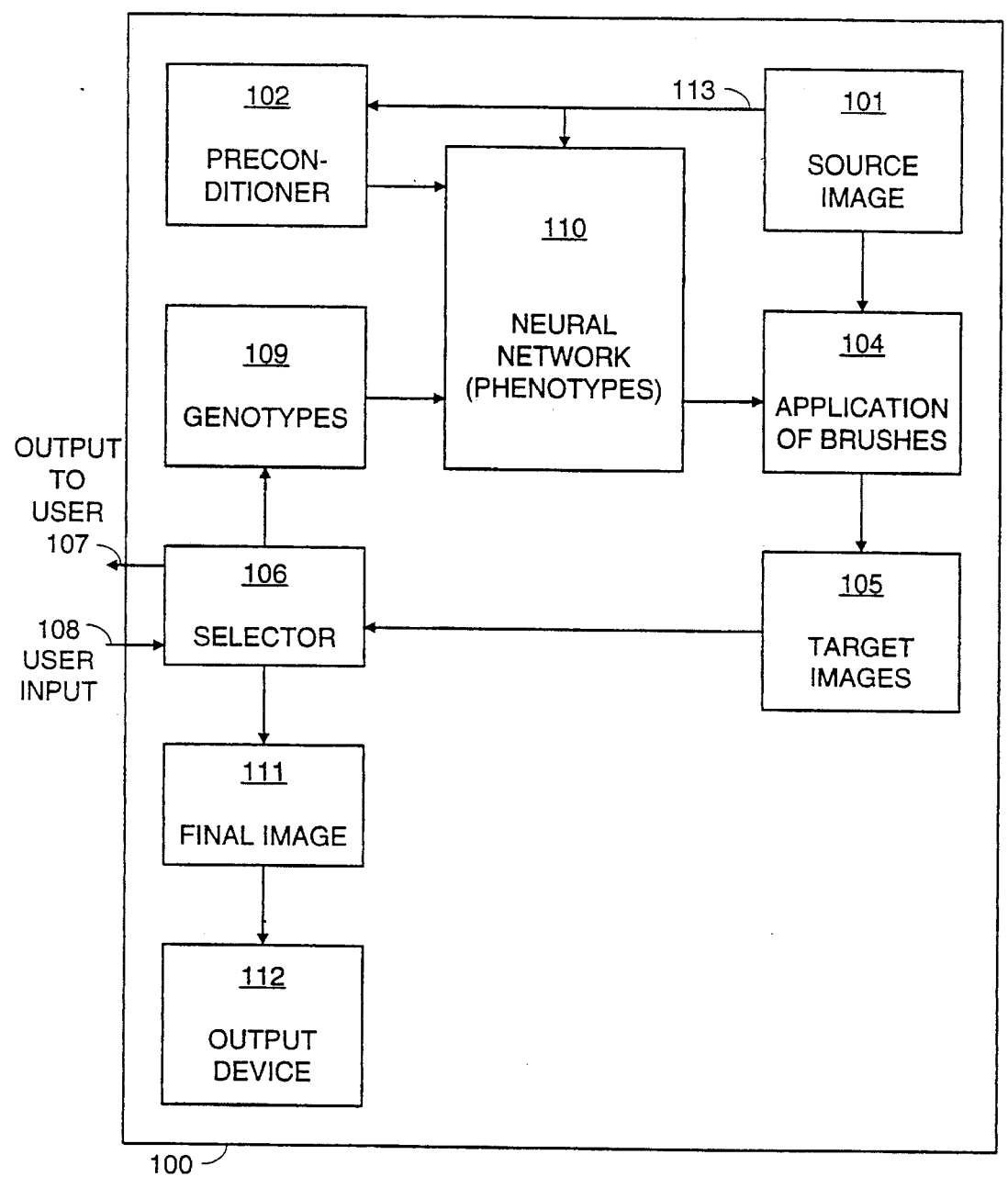
FIG. 1 is a block diagram of an image processing system according to the present invention.
Figure 5:
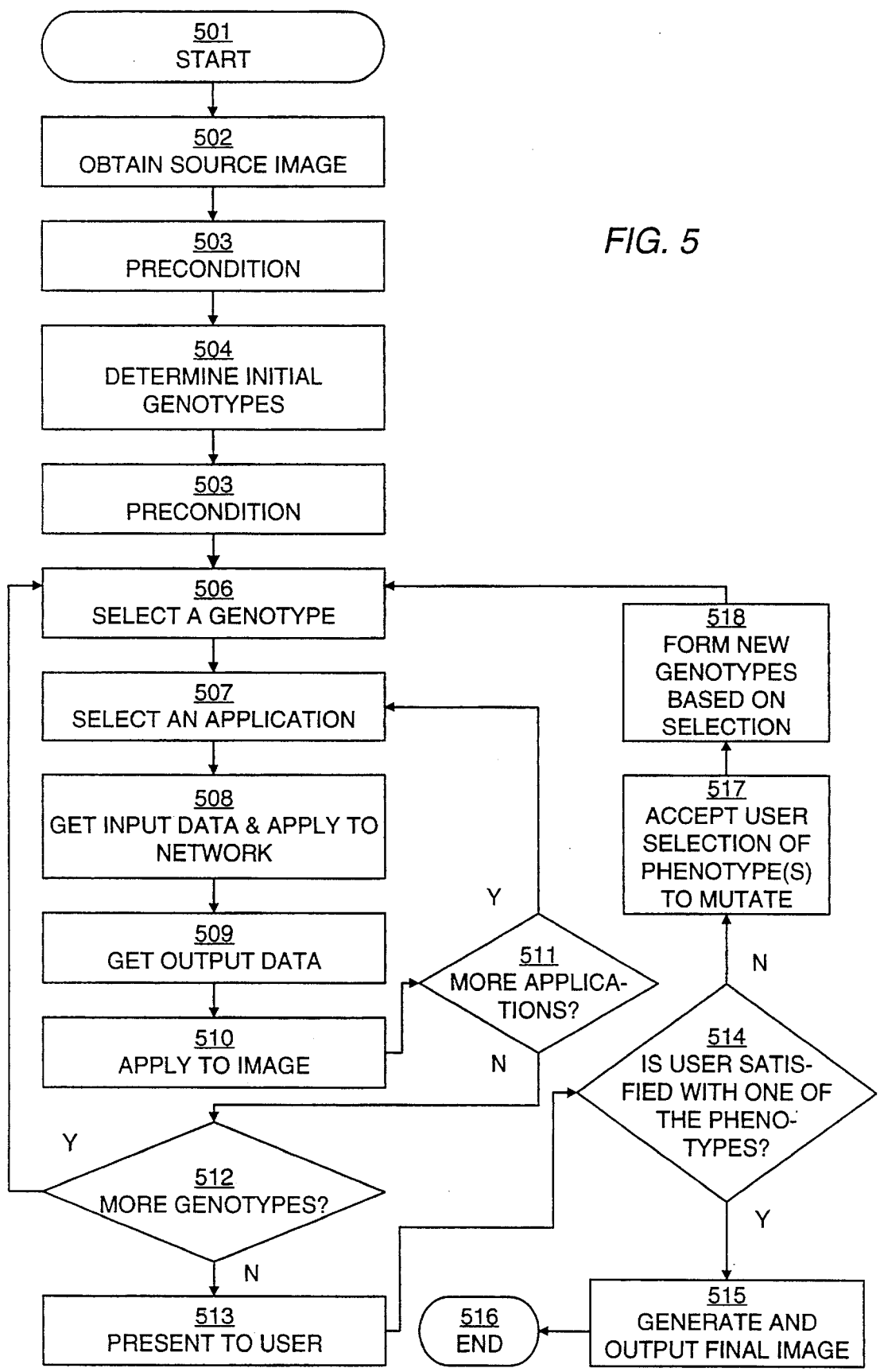
FIG. 5 is a flowchart showing the operation of the image processing system of the present invention.

Referring now to FIG. 1, there is shown a block diagram of a typical implementation of image processing system 100 in accordance with the present invention. Referring also to FIG. 5, there is shown a flowchart of the operation of the present invention. First, system 100 obtains 502 source image 101, which may be supplied to system 100 using one or more input devices (such as a video camera), or may be read from data storage (such as a disk). Alternatively, it is possible to use system 100 without a source image, in which case the invention performs image synthesis as well as image processing.

Raw information 113 describing source image 101 is then sent 503 to preconditioner 102. Preconditioner 102 models certain parts of the human pre-attentive visual system, so as to extract formal information, representing structural or abstract features, from source images at different scales. Examples of such derived information 103 include edge detail and gradient information.

Preconditioner 102 uses a stack of f-meshes, as described in U.S. patent application Ser. No. 07/983,894, filed Dec. 1, 1992, for "Dynamic Image Processing Using Particle Systems" to provide high-pass (Laplacian) and low-pass (Gaussian) information at several levels of scaling. Each f-mesh models a finite-element diffusive array in two dimensions. After an initial seeding by luminance (or chrominance) values from an image, an f-mesh is incrementally updated, diffusing information from each element to its neighbors. This effectively implements a low-pass filter which approximates convolution with a Gaussian kernel. In the preferred embodiment, two such f-meshes at each level of resolution are seeded with the same luminance information from the source image, but they are given different diffusion coefficients prior to updating. Subtracting one f-mesh from the other, in an element-by-element fashion, results in a good approximation of a DOG (Difference of Gaussians) filter. This has been shown to be an approximation of neural circuitry in the human pre-attentive visual system. Specifically, this technique models the known "on-center off-surround" mechanism found at different levels in human pre-attentive visual processing. Zero-crossings of DOG's provide good information about the location and magnitude of edges in an image. F-meshes also provide gradient orientation, derivative and magnitude information, and they buffer noise in moving sequences, which can be advantageous.

Alternatively, preconditioner 102 can directly implement known Gaussian and Laplacian pyramidal data structures. Gaussian and Laplacian pyramids are known in the art, as disclosed in Rosenfeld, A., ed., *Multi-Resolution Image Processing and Analysis*, Springer-Verlag, 1984. In order to implement such structures, high-pass and low-pass information from the source image may be provided as inputs to the neural network at multiple scales.

The present invention uses one or more neural networks 110 to control the parameters of brushes 104 that perform image-processing and image-synthesis operations on source image 101. Neural networks are known. Generally, they employ a technique of "learning" relationships through repeated exposure to data and adjustment of internal weights, or gain factors. They are often used for model development and automated data analysis. Essentially, such networks represent a statistical modeling technique that is capable of building models from data containing both linear and non-linear relationships. While similar in concept to regression analysis, neural networks are able to capture nonlinearity and interactions among independent variables without pre-specification. In other words, while traditional regression analysis requires that nonlinearities and interactions be detected and specified manually, neural networks perform these tasks automatically.

Figure 2:
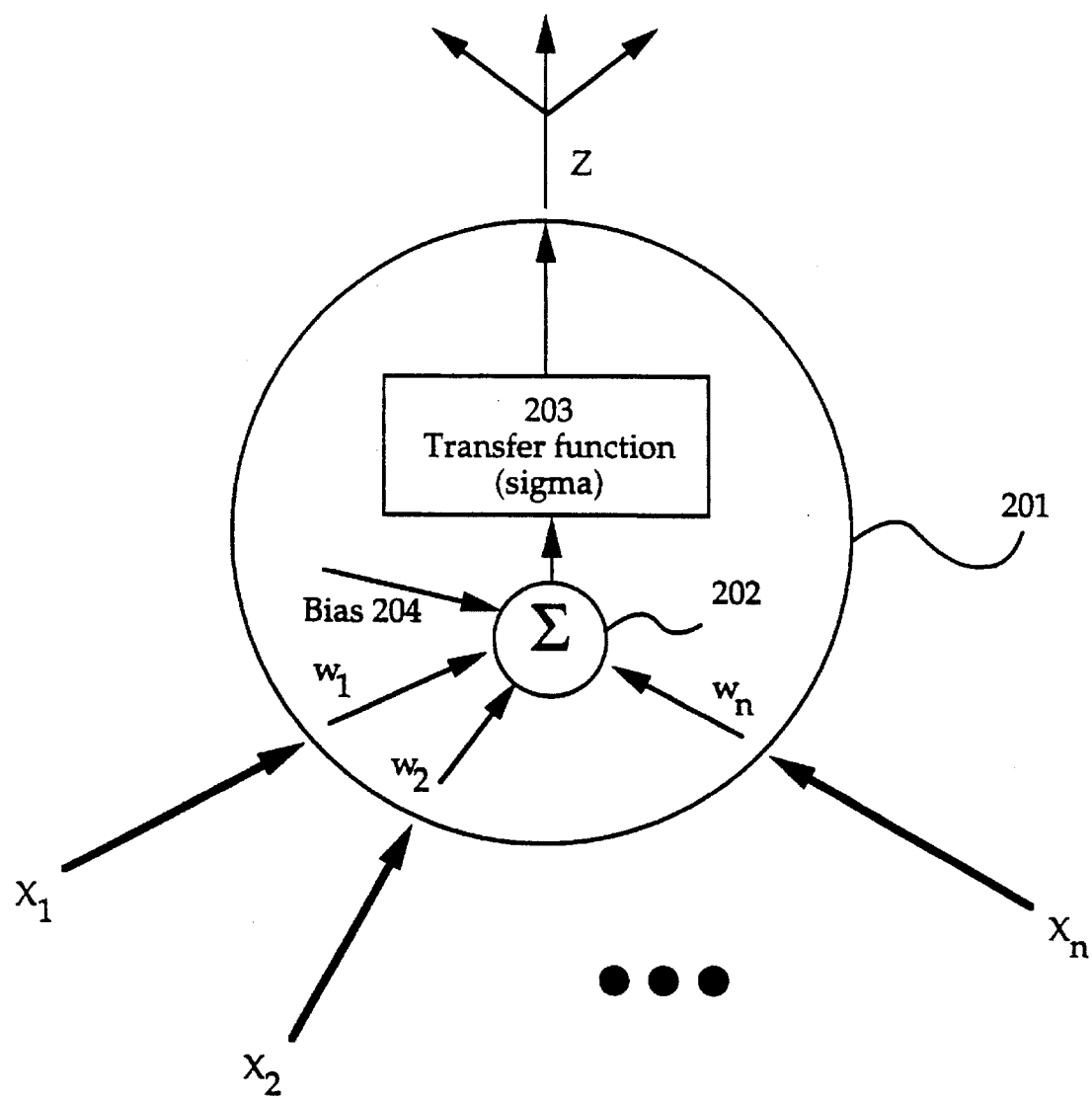
FIG. 2 is a diagram of a single neuron.

Neural networks comprise a number of interconnected neurons that send data to each other along connections. The strengths of the connections among the neurons are represented by weights. Referring now to FIG. 2, there is shown a diagram of a single neuron 201. The neuron receives inputs $X_1, X_2, \ldots X_n$, either from other neurons or directly from inputs to the system. It multiplies each of its inputs by a corresponding weight $w_1, w_2, \ldots w_n$ and adds the results together with a bias term 204 to form a weighted sum 202. The bias value 204 associated with each hidden and output neuron is equivalent to a constant weight input to the neuron.

It then applies a transfer function 203 (which may or may not be linear) to the weighted sum, to obtain a value Z known as the state of the neuron. The state Z is then either passed on to another neuron along a weighted connection, or provided as an output signal. Collectively, states are used to represent information in the short term, while weights represent long-term information or learning.

Thus, the behavior of a neuron can be described by the equation:

$$Z = u\left( \sum_{j=1}^{n} w_j X_j + B \right) \quad \text{(Eq. 1)}$$

where:

Z is the output of the neuron;

u(x) is the transfer function of the neuron;

wj is the weight for input j;

Xj is the value of input j; and

B is the bias of the neuron.

Transfer function u(x) can take any of a number of different forms. For example, it may be a sigmoidal function, such as:

$$u(x) = \frac{1}{1 + e^{-\alpha x}} \quad \text{(Eq. 2)}$$

Alternatively, u(x) may be a linear function, such as:

$u(x) =$ $-1, x \leq -\sigma$ $1, x \geq \sigma$ $[(x+\sigma)/\sigma] - 1, -\sigma < x < \sigma.$ (Eq. 3)

Finally, u(x) may be a step function, such as:

$u(x) = -1, x < 0 \quad 1, x \geq 0$ (Eq. 4)

Figure 3:
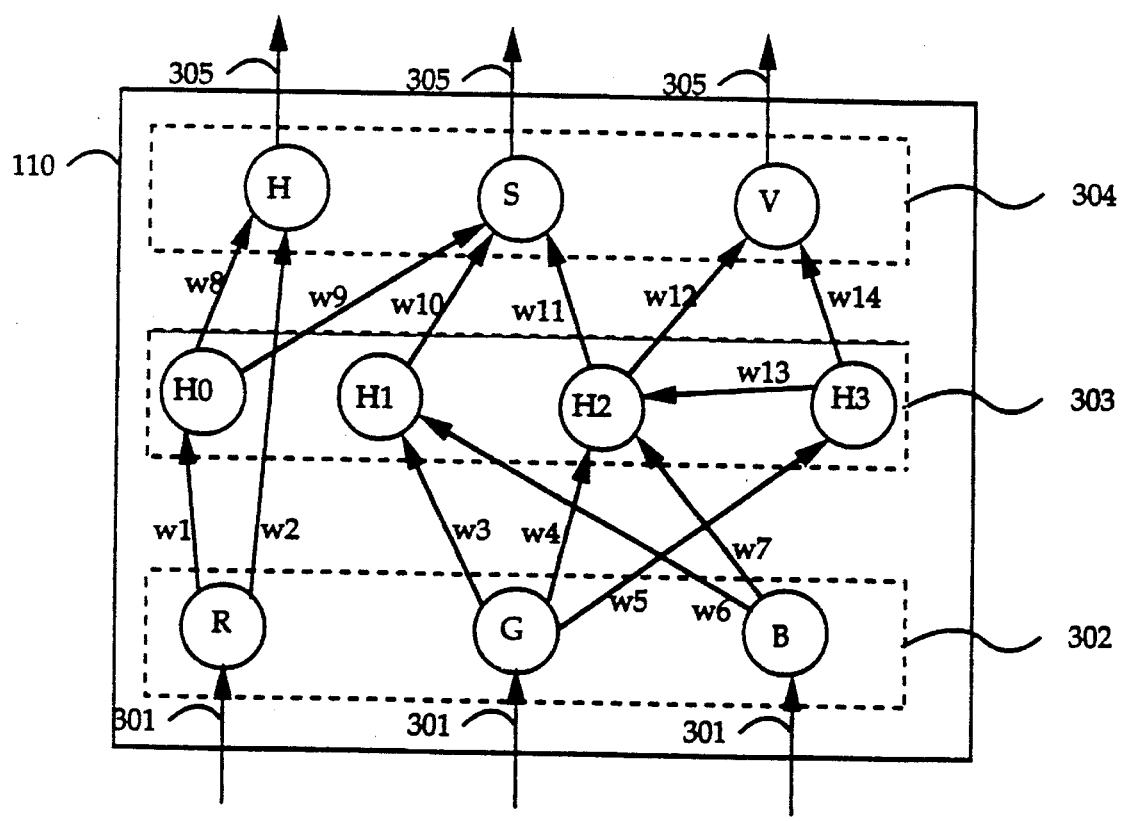
FIG. 3 is a diagram of a sample neural network.

Neurons in a neural network can be grouped into three categories: input neurons (those which receive input data values); output neurons (those which produce output values); and hidden neurons (all others). The purpose of hidden neurons is to allow the neural network to build intermediate representations that combine input data to provide modeling techniques for complex nonlinear relationships. Referring now to FIG. 3, there is shown a diagram illustrating the a sample neural network. Inputs 301 are supplied to a layer of input neurons 302. The outputs of the input neurons are passed to a layer of hidden neurons 303. Typically there are several such layers of hidden neurons. Eventually, hidden neurons pass outputs to a layer of output neurons 304, and the output neurons produce output values 305. Weights are indicated by w1–w14 in FIG. 3.

Neural networks are "trained" by a process of iterative modification of their weights. Conventional training processes generally involve the following steps:

1) Repeatedly presenting examples of a particular input/output task to the neural network model;

2) Comparing the model output and desired output to measure error; and

3) Modifying model weights to reduce the error.

This set of steps is repeated until further iteration fails to decrease the error. Then, the network is said to be "trained." Once training is completed, the network can generate outcomes for new data inputs.

In the present invention, derived information 103 and raw information 113 are provided as inputs to neural network 110. Inputs that may be provided include, for example:

x-coordinate within the image;

y-coordinate within the image;

RGB color values;

Luminosity values, grad values, and grad-squared values at different scales;

Curl of vector field;

"Busyness" of the image (by mean Laplacian transform);

Outputs of other networks.

Neural network 110 is employed to control brushes for the purpose of either performing specific image processing tasks, or generating aesthetically pleasing or interesting images. Network 110 outputs include, for example:

HSV color value;

Brush transparency;

Brush scale (x-size and y-size);

Brush orientation;

Brush z-position (for three-dimensional effects);

Brush x & y position offset;

Brush shape;

Brush specularity (for rendering);

Brush height (for rendering);

Parameters for selecting among a set of other brushes;

Interpolation factor between two other genotypes (for gene morphing, as described below);

A neural network with a given transfer function at each node is completely specified by 1) the number and mapping of its inputs; 2) the number of hidden neurons; 3) the number and mapping of its outputs; 4) the weights, or strength of connections between neurons; 5) the bias of each hidden and output neuron; and 6) any control parameters (such as sigma σ) associated with the transfer function of each hidden and output neuron, if used.

Figure 6:
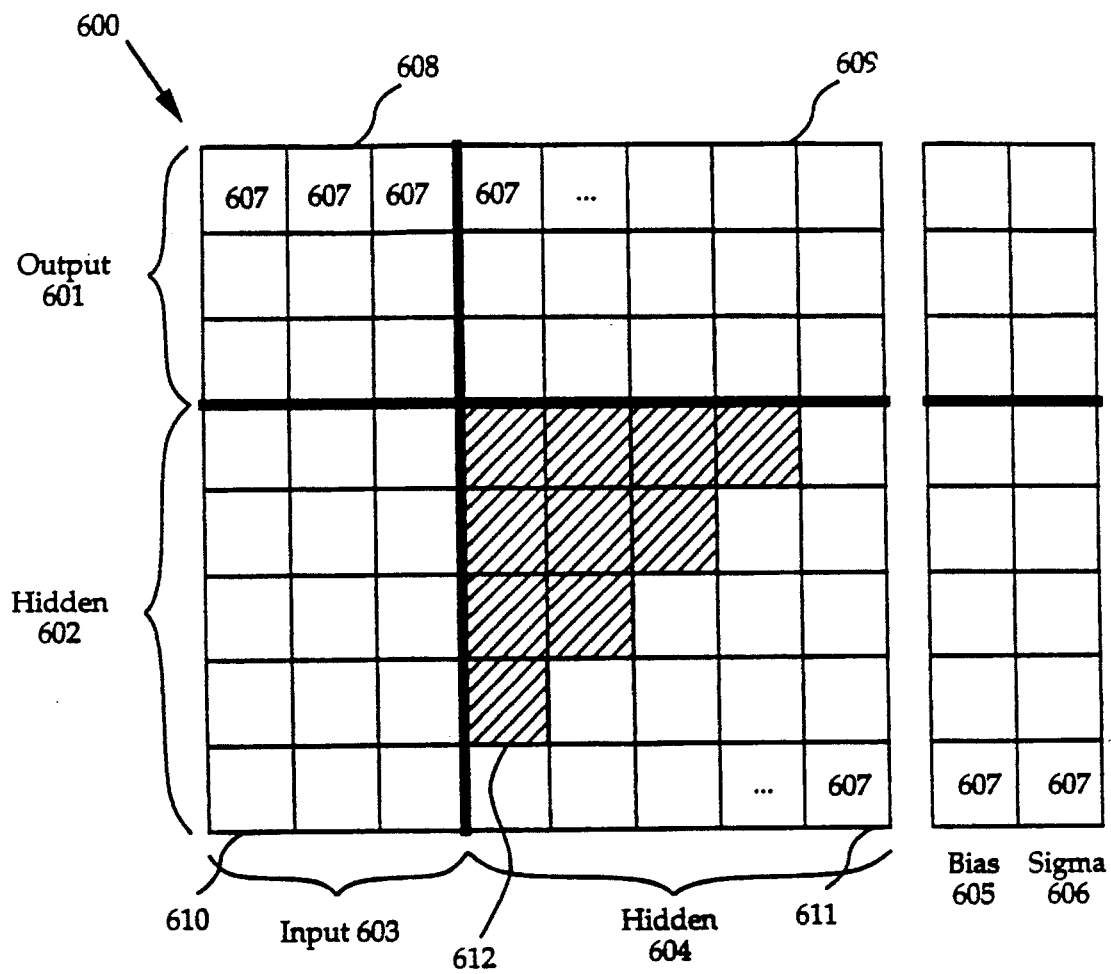
FIG. 6 is a diagram of a connectivity matrix.

In the present invention, a maximum number of possible inputs, hidden neurons, and output neurons is set as an arbitrary constant. Then a connectivity matrix is created, as shown in FIG. 6. In connectivity matrix 600, columns 603 and 604 correspond to all possible input sources for nodes, and rows 601 and 602 correspond to all possible recipients of inputs. The intersections of the rows and columns yields a series of cells 607. In addition, cells 607 are provided for bias values 605 and sigma values 606 for each output neuron and hidden neuron. Any non-zero cell 608 in the matrix (other than cells in columns 605 and 606) corresponds to a connection between two neurons, and the value in the cell 608 indicates the weight of the connection between the neurons. A zero value indicates that there is no connection between the neurons. In the preferred embodiment, all weights lie in the range from −1 to +1, although this constraint is not required to practice the present invention.

Thus, each row in matrix 600 is associated with an individual hidden or output neuron, and maps all of its input connections from other (input or hidden) neurons. Each column in matrix 600 (except columns 605 and 606) is associated with an individual input or hidden neuron, and contains all of its output weights to other neurons.

Matrix 600, exclusive of bias column 605 and sigma column 606, can be divided into four quadrants 608–611. Quadrant 608 contains connection weights from input neurons to output neurons; quadrant 609 contains connection weights from hidden neurons to output neurons; quadrant 610 contains connection weights from input neurons to hidden neurons; and quadrant 611 contains connection weights from hidden neurons to hidden neurons. A portion 612 of quadrant 611, indicated by shading, represents the feedforward portion of the matrix; if the network topology does not include feedback, only this portion 612 of quadrant 611 will contain non-zero values. Normally, however, there is no such restriction unless the user so specifies; recurrent or feedback connections are possible.

The size of matrix 600 is given by the equation:

$$\text{Size} = (I+H+2)*(O+H) \quad \text{(Eq. 5)}$$

where:

I=maximum number of input neurons;

H=maximum number of hidden neurons;

O=maximum number of output neurons.

In the preferred embodiment, I=30, H=40, and O=20, yielding matrix size of 4,320, although any other values may be used.

Figure 4:
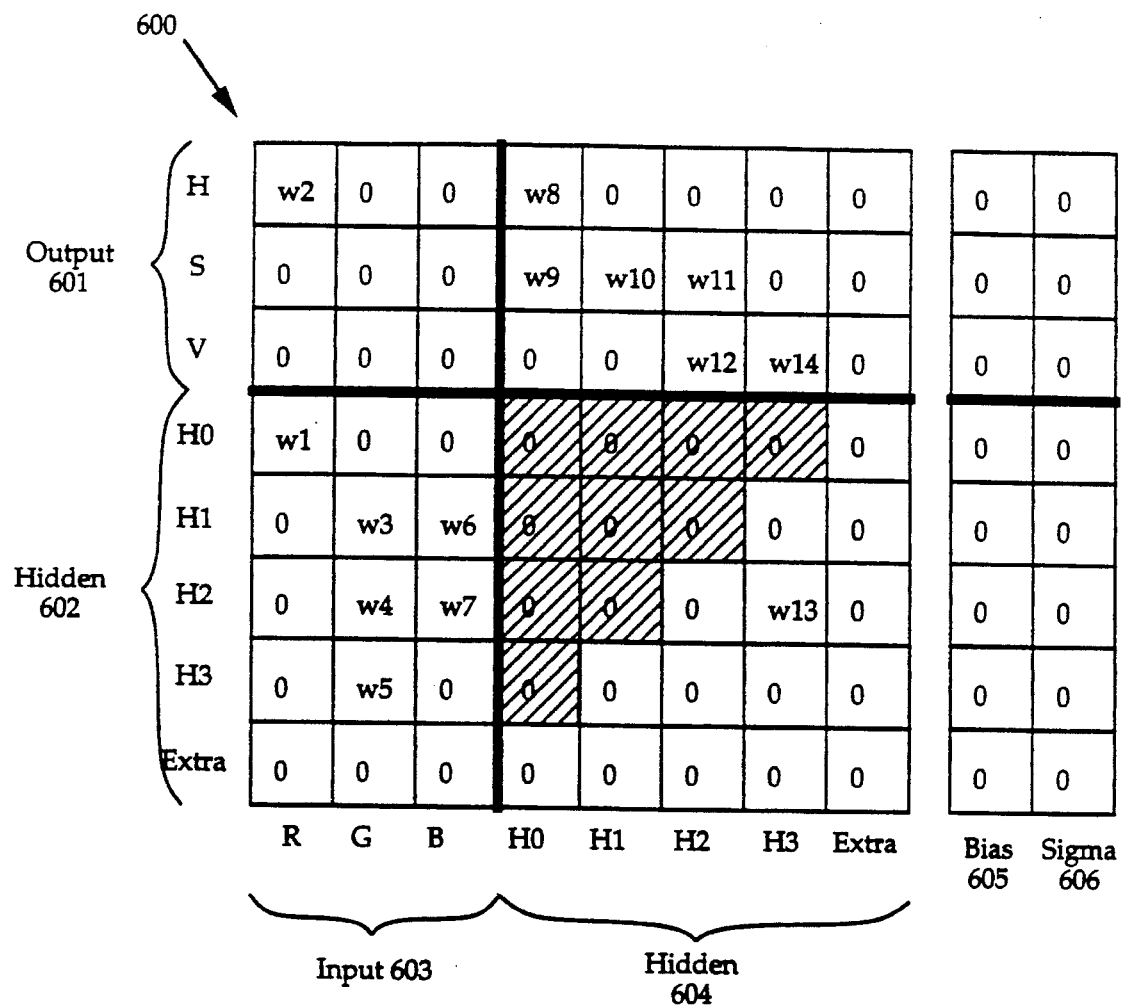
FIG. 4 is a diagram of a sample connectivity matrix.

Referring now to FIGS. 3 and 4, there is shown a sample neural network 110 and its associated connectivity matrix 600. Each of weights w1–w14 is indicated by a corresponding non-zero value in matrix 600 of FIG. 4. For illustrative purposes, matrix 600 is relatively small and contains zeroes for all bias and sigma values.

Any connectivity matrix 600 can be represented by a one-dimensional vector containing a string of numbers corresponding to a row-by-row "unfolding" of the matrix 600. For example, matrix 600 of FIG. 4 can be represented by the 80-component vector:

{w2,0,0,w8,0,0,0,0,0,0,0,0,w9,w10,w11,0,0,0,0,0,0,0,
  0,0,w12,w 14,0,0,0,w1,0,0,0,0,0,0,0,0,0,0,w3,w6,0,0,
  0,0,0,0,0,0,w4,w7,0,0,0,w 13,0,0,0,0,w5,0,0,0,0,0,0,0,
  0,0,0,0,0,0,0,0,0,0}

This vector completely defines the network 110 shown in FIG. 3. In the preferred embodiment, vectors contain 4,320 components, although any other size may be used.

Thus, any network can be completely defined by a one-dimensional vector of the type just described. A particular vector for defining network 110 can be considered a "genotype". By analogy to biological mutation, each of the vector components can be considered a "gene" capable of mutation, as described below. Each genotype can be used to construct a corresponding phenotype, which is an instantiation of neural network 110.

When performing specific tasks, relative effectiveness of the network may be objectively measured in order to perform training as described above. However, when the system is being used to explore various aesthetic possibilities with no objective measurement of effectiveness, conventional training methods that measure error from a series of sample inputs and outputs are largely inapplicable. Accordingly, the system of the present invention utilizes feedback from the user to control changes to network parameters, in the following manner.

Referring again to FIG. 5, a number of initial network vectors, or genotypes, are determined 504 by a process known as "seeding". In the preferred embodiment, sixteen initial genotypes are determined, although any number may be used. If desired, the number of genotypes to be presented may be user-configurable. To generate an initial population of random genotypes, individual vector components (genes) are chosen at random from within a predefined range of values. In the preferred embodiment, the range is from −1 to +1.

For each genotype in the given population, a phenotype neural network 110 is instantiated 505. A genotype is selected 506. The corresponding phenotype is then applied one or more times to a target image according to steps 507–511: An application is selected by choosing a position within the image. Choice of position may be made randomly, or may be implemented under user control. Image data from source image 101 and/or preconditioner 102 is sampled at the selected position and applied 508 as inputs to network 110. Network 110 is then updated 509 combining input data according to its internal structure and weights, and generating output data vector 305. This output data is then used to parameterize a brush 104 which is applied 510 to the target image 105. Then, if more applications are desired 511, another application position is selected 506. Once all applications are processed, if more genotypes exist 512, steps 506–511 are repeated.

Application of brushes as image processing or image synthesis elements is known. If desired, the dynamic image processing techniques described in U.S. patent application Ser. No. 07/983,894, filed Dec. 1, 1992, for "Dynamic Image Processing Using Particle Systems" may be employed.

Target images 105 are sent to selector 106. Selector 106 presents 513 output 107 showing target images 105 to the user and accepts user input 108. If the user indicates that he or she is satisfied 514 with one of the displayed target images, the target image 105 becomes final image 111, which is then generated 515 and sent to output device 112 (such as a screen, printer, or image storage device).

If the user is not satisfied 514 with any of the displayed target images, he or she selects 517 one or more of them and their corresponding genotypes for further exploration. In the preferred embodiment, the user may select one or two genotypes, although in other embodiments more than two may be selected. A new set of genotypes 109 (sixteen in the present invention) is generated 518 by mutation from the genotypes of the selected images. If the user selected one image, the new genotypes are generated 518 by creating multiple mutations of the genotype corresponding to that image. If the user selected two images, each new genotype is generated 518 by performing a crossover of the genotypes corresponding to the selected images, followed by mutation. Thus, brush behavior is modified and a new set of genotypes 105 is created.

Crossover is performed by splicing parts of two vectors end to end to create a new vector of the same length.

Mutation of a genotype is performed as follows. At each position in the genotype, a probability of mutation of the corresponding value (gene) is determined by a combination of the corresponding mask value and an optional user-specified probability. In the preferred embodiment, mutation at a particular location in the genotype is enabled if the corresponding bit is the mask is set. Mutation occurs according to a global probability set by the user. If mutation does occur, the current value of the gene is added to a Gaussian random value whose variance can be controlled by the user. In this fashion, rate of mutation, and thus of exploration of genotype space, can be controlled.

Steps 505 through 514 are then repeated until the user is satisfied with one of the displayed images.

In some cases, the comparative effectiveness of genotypes in performing a particular task is capable of objective measurement. For example, the desired image processing operation may be colorspace conversion (such as RGB to HSV) or edge identification. In these cases, genotypes can be selected for further exploration based on the accuracy or effectiveness with which they operate, rather than by user selection according to aesthetic suitability. This can be accomplished through the use of known genetic modeling processes, such as those disclosed in Goldberg, David E., *Genetic Algorithms in Search Optimization and Machine Learning*, Addison-Wesley, 1989; Holland, J. H., *Adaptation in Natural and Artificial Systems*, University of Michigan Press, 1975. Once selected, such specialized genotypes may be utilized, through subnet fusion to construct sub-components of larger networks.

In another embodiment of the present invention, the selector 106 may allow the user to directly control genes (or network vector components). If desired, a form of masking may be used, where certain genes are held constant when new genotypes are generated. If desired, genetic masking can be used to constrain networks to have certain topology, such as strictly feedforward or layered. Thus, the direction of mutation, or the nature of the neural network, can be controlled or influenced.

In general, masking is implemented by providing a mask vector of kN bits, where N is the size of each genotype vector and k is the number of control bits needed for each vector component (k=1 in the preferred embodiment, although any number may be used). Each set of k bits in the mask vector corresponds to a specific position in the genotype. The state of the set of k bits specifies the probability of mutation of the gene at the specific position. In the preferred embodiment where k=1, the mask vector permits enablement or disablement of mutation for each gene, by allowing the corresponding bit to be either on or off. If k is two or greater, intermediate probabilities may be provided. This technique permits the user to disable mutation for specific genes once their values have achieved a state that is deemed satisfactory, which can be useful for subnet fusion, as described below.

In addition, a technique of genetic morphing may be used. The user selects two phenotypes, and the system defines a continuum of genotypes by interpolation between the genotypes for the two selections. Since the genotype is a vector of real numbers, it can be considered as a point in a bounded multidimensional space. The interpolated continuum is represented by a straight line in this space, connecting the two points representing the genotypes of the two user selections. The user can then explore the continuum to select the most desirable of the interpolated phenotypes. At each point along the continuum, an interpolated genotype can be generated, and from it a corresponding phenotype neural network instantiated and applied to an image.

If desired, a technique of subnet fusion may be employed, wherein networks can be developed incrementally, and merged to control a particular brush, with each network controlling a specified subset of brush parameters. This technique is useful for complex networks, as it facilitates refinement of one aspect of brush behavior (such as color) without adversely affecting other aspects (such as size). In addition, this technique is particularly useful for assimilating a plurality of subnets developed using traditional genetic modeling processes, as described in the references cited above.

When subnet fusion is employed, small neural networks (or "subnets") are trained to do specific tasks. Subnets are then merged (or "fused") into a larger network. Immediately after fusion, the subnets are disjunct and are represented by distinct non-overlapping subsets of the genotype and corresponding mask, if applicable. Further mutation of fused networks, if desired, can result in new connections between the subnets. If desired, genetic masking (discussed above) may be used to "freeze" particular subnets selectively, preventing further mutation.

The techniques of the present invention may also be applied to animation effects. The interval of time associated with an animation is mapped onto a continuum of genotypes, as discussed above in connection with genetic morphing. At each moment in time, a corresponding genotype is generated, and its corresponding phenotype neural network instantiated. This network is then used to control brushes applied to a frame of the animation.

In another embodiment, the techniques described above may be used to create a genotype which may then be associated with an on-screen cursor. The user may then apply the genotype to selected areas of the screen by pointing and clicking a mouse or other input device to control and activate the cursor. In effect, this technique allows the user to "paint" onto selected areas of an on-screen image using a brush defined by a genotype.

In general, it has been found preferable to provide system 100 according to an object-oriented software environment in a powerful personal computer or workstation. Preconditioner 102, neural network 110, brushes 104, and selector 106 operate under software control. Source image 101, phenotypes 105, genotypes 109, and final image 111 may be stored in conventional random-access-memory (RAM) or disk storage.

What is claimed is:

1. An image processing system, comprising:

an image input device for providing source image;

plurality of image processing elements, each for selectively transforming a portion of the source image to produce a target image;

a storage device for storing the target image;

a neural network having inputs coupled to the image input device and outputs coupled to the image processing elements, for receiving the source image and for controlling the image processing elements;

means for defining a configuration of the neural network; and an output device, coupled to the storage device, for outputting the target image;

wherein the neural network comprises:
 a plurality of neurons, each neuron comprising at least one input and at least one output; and
 a plurality of weighted connections between neurons;

and wherein the defining means comprises a genotype having a plurality of numerical components specifying the weights of the connections.

2. An image processing system, comprising:

an image input device for providing a source image:

a plurality of image processing elements, each for selectively transforming a portion of the source image to produce a target image;

a storage device for storing the target image;

a neural network having inputs coupled to the image input device and outputs coupled to the image processing elements, for receiving the source image and for controlling the image processing elements;

means for defining a configuration of the neural network; and an output device, coupled to the storage device, for outputting the target image;

wherein the neural network comprises:
 a plurality of neurons, each neuron comprising at least one input and at least one output; and
 a plurality of weighted connections between neurons;

and wherein the defining means comprises a genotype having a plurality of numerical components specifying the weights of the connections; wherein:

each neuron further comprises a bias value and a sigma value; and the genotype further comprises a plurality of components specifying the bias value and the sigma value of each neuron.

3. An image processing system, comprising:

an image input device for providing a source image;

a plurality of image processing elements, each for selectively transforming a portion of the source image to produce a target image;

a storage device for storing the target image;

a neural network having inputs coupled to the image input device and outputs coupled to the image processing elements, for receiving the source image and for controlling the image processing elements;

means for defining a configuration of the neural network; and an output device, coupled to the storage device, for outputting the target image;

wherein the neural network comprises:
 a plurality of neurons, each neuron comprising at least one input and at least one output; and
 a plurality of weighted connections between neurons;

and wherein the defining means comprises a genotype having a plurality of numerical components specifying the weights of the connections; wherein each neuron further comprises a bias value and a sigma value; and the genotype further comprises a plurality of components specifying the bias value and the sigma value of each neuron;

further comprising means, coupled to the defining means, for mutating the genotype.

4. An image processing system, comprising:

an image input device for providing a source image;

a plurality of image processing elements, each for selectively transforming a portion of the source image to produce a target image;

a storage device for storing the target image;

a neural network having inputs coupled to the image input device and outputs coupled to the image processing elements, for receiving the source image and for controlling the image processing elements;

means for defining a configuration of the neural network; and an output device, coupled to the storage device, for outputting the target image;

further comprising a preconditioner having inputs coupled to the image input device and outputs coupled to the neural network, for preconditioning the source image;

wherein the preconditioner further comprises:
   a plurality of f-meshes for deriving high-pass and low-pass information from the source image, each f-mesh having a plurality of mesh elements;
   means for initially seeding each f-mesh;
   means for incrementally updating each f-mesh by diffusing information between mesh elements; and
   a subtractor for subtracting derived information of a first f-mesh from derived information of a second f-mesh.

5. An image processing system, comprising:
   an image input device for providing a source image;
   a plurality of image processing elements, each for selectively transforming a portion of the source image to produce a target image;
   a storage device for storing the target image;
   a neural network having inputs coupled to the image input device and outputs coupled to the image processing elements, for receiving the source image and for controlling the image processing elements;
   means for defining a configuration of the neural network; and an output device, coupled to the storage device, for outputting the target image;
   further comprising a preconditioner having inputs coupled to the image input device and outputs coupled to the neural network, for preconditioning the source image;
   wherein the preconditioner further comprises:
      a plurality of f-meshes for deriving high-pass and low-pass information from the source image, each f-mesh having a plurality of mesh elements;
      means for initially seeding each f-mesh;
      means for incrementally updating each f-mesh by diffusing information between mesh elements; and
      a subtractor for subtracting derived information of a first f-mesh from derived information of a second f-mesh;
   wherein each f-mesh comprises means for modeling a finite-element diffusive array in at least two dimensions.

6. An image processing system, comprising:
   an image input device for providing a source image;
   a neural network having inputs coupled to the image input device and having outputs, for receiving the source image and for controlling the image processing elements;
   means for providing a plurality of genotypes, each genotype defining a configuration of the neural network;
   a plurality of image processing elements, each for selectively transforming a portion of the source image to produce a plurality of target images corresponding to the genotypes;
   a storage device for storing the target images; and
   an output device, coupled to the storage device, for outputting the target images.

7. The system of claim 6, further comprising:
   a selector for selecting one of the target images; and
   mutation means for generating a plurality of new genotypes by mutating the genotype corresponding to the selected target image.

8. The system of claim 7, wherein the selector accepts user input to select the target image.

9. The system of claim 7, wherein the selector selects the target image according to comparative effectiveness in performing a particular task.

10. The system of claim 7, wherein the selector selects the target image according to results from a genetic modeling process indicating comparative effectiveness in performing a particular task.

11. The system of claim 7, wherein the mutation means comprises a configurable random number generator.

12. The system of claim 7, further comprising means for providing a mask vector for specifying respective mutation probabilities of genotype portions.

13. The system of claim 6, further comprising:
   a selector for selecting a subset of the target images;
   a cross-breeder for combining the genotypes corresponding to the target images of the selected subset into a cross-bred genotype; and
   mutation means for generating a plurality of new genotypes by mutating the cross-bred genotype.

14. The system of claim 6, further comprising:
   a selector for selecting two of the target images;
   an interpolator for defining a continuum of genotypes by interpolation between the genotypes corresponding to the selected target images; and
   means for specifying a genotype on the continuum.

15. An image processing system, comprising:
   an image input device for providing a source image;
   a plurality of image processing elements, each for selectively transforming a portion of the source image to produce a target image;
   a storage device for storing the target image;
   at least two neural subnets, each subnet having inputs coupled to the image input device, for receiving the source image;
   means for defining the configuration of the neural subnets;
   means for merging the neural subnets to form a merged network having outputs coupled to the image processing elements, for controlling the image processing elements;
   an output device, coupled to the storage device, for outputting the target image.

16. A computer-implemented method of processing an image, comprising the steps of:
   (a) accepting data describing a source image;
   (b) determining at least one genotype defining a neural network for controlling a plurality of image processing elements;
   (c) for each genotype, performing the steps of:
      (c.1) applying the source image data to the neural network as defined by the genotype;
      (c.2) determining attributes of the image processing elements based on the results of step (c.1); and
      (c.3) applying the image processing elements to the source image to create a target image; and
   (d) outputting each target image.

17. The method of claim 16, wherein the step of determining at least one genotype comprises the step of determining a plurality of numerical components specifying weights of connections within the neural network.

18. The method of claim 17, wherein the step of determining at least one genotype further comprises the step of determining a plurality of numerical components specifying bias values and sigma values within the neural network.

19. The method of claim 16, further comprising the steps of:
   (e) mutating the genotype; and
   (f) repeating steps (c) and (d).

20. The method of claim 16, further comprising the step of, before determining at least one genotype, preconditioning the data describing the source image.

21. The method of claim 20, wherein the preconditioning step comprises the substeps of:
   initially seeding a plurality of f-meshes, each f-mesh comprising means for modeling a finite-element diffusive array in at least two dimensions;
   incrementally updating each f-mesh by diffusing information between mesh elements; and
   subtracting information of a first f-mesh from information of a second f-mesh.

22. A computer-implemented method of processing an image, comprising the steps of:
   (a) accepting data describing a source image;
   (b) determining at least two genotypes defining a neural network for controlling a plurality of image processing elements;
   (c) for each genotype, performing the steps of:
      (c.1) applying the source image data to the neural network as defined by the genotype;
      (c.2) determining attributes of the image processing elements based on the results of step (c.1); and
      (c.3) applying the image processing elements to the source image to create a target image; and
   (d) outputting each target image.

23. The method of claim 22, further comprising the steps of:
   (e) selecting one of the target images;
   (f) mutating the genotype corresponding to the selected target image to generate a plurality of new genotypes; and
   (g) outputting the new genotypes.

24. The method of claim 23, wherein step (e) comprises accepting user input specifying one of the target images.

25. The method of claim 23, wherein step (e) comprises comparing effectiveness of the target images in performing a predefined task.

26. The method of claim 23, wherein step (e) comprises performing a genetic modeling process to determine comparative effectiveness of the target images in performing a particular task.

27. The method of claim 23, wherein step (f) comprises applying a configurable random number generator to the genotype.

28. The method of claim 23, further comprising the step of, prior to mutating the genotype, accepting user specification of respective mutation probabilities of genotype portions;
   and wherein step (f) comprises mutating the genotype according to the specified mutation probabilities.

29. The method of claim 22, further comprising the steps of:
   (e) selecting one of the target images;
   (f) mutating the genotype corresponding to the selected target image to generate a plurality of new genotypes; and
   (g) outputting the new genotypes.

30. The method of claim 22, further comprising the steps of:
   (e) selecting a subset of the target images;
   (f) cross-breeding the genotypes corresponding to the target images of the selected subset to form a cross-bred genotype;
   (g) mutating the cross-bred genotype to generate a plurality of new genotypes; and
   (g) outputting the new genotypes.

31. The method of claim 22, further comprising the steps of:
   (e) selecting two of the target images;
   (f) interpolating between the genotypes corresponding to the selected target images to define a continuum of genotypes; and
   (g) specifying a genotype on the continuum.

32. A computer-implemented method of processing an image, comprising the steps of:
   (a) accepting data describing a source image;
   (b) determining at least two genotypes defining at least two neural subnets;
   (c) merging the neural subnets to form a merged network for controlling image processing elements;
   (c) for each genotype, performing the steps of:
      (c.1) applying the source image data to the merged network as defined by the genotype;
      (c.2) determining attributes of the image processing elements based on the results of step (c.1); and
      (c.3) applying the image processing elements to the source image to create a target image; and
   (d) outputting each target image.

* * * * *